US008825658B1

(12) United States Patent
Suvar (10) Patent No.: US 8,825,658 B1
(45) Date of Patent: Sep. 2, 2014

(54) ORGANIZING INDICATIONS OF APPROVAL FOR COLLECTIONS

(75) Inventor: Bogdan Suvar, Dublin (IE)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 13/431,463

(22) Filed: Mar. 27, 2012

(51) Int. Cl.
*G06F 17/30* (2006.01)
*G06F 7/00* (2006.01)

(52) U.S. Cl.
CPC .... *G06F 17/30864* (2013.01); *G06F 17/30867* (2013.01); *G06F 17/30964* (2013.01); *G06F 17/30657* (2013.01)
USPC .......................................................... 707/738

(58) Field of Classification Search
USPC .......................................................... 707/738
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0162431 A1* | 7/2008 | Xu et al. | 707/3 |
| 2008/0192656 A1 | 8/2008 | Vagelos | |
| 2010/0306185 A1* | 12/2010 | Smith et al. | 707/709 |
| 2010/0312767 A1* | 12/2010 | Saito | 707/739 |
| 2011/0098156 A1 | 4/2011 | Ng et al. | |
| 2011/0258016 A1* | 10/2011 | Barak et al. | 705/7.29 |

FOREIGN PATENT DOCUMENTS

WO WO0279984 10/2002

OTHER PUBLICATIONS

Adamic et al., "A Social Network Caught in the Web," Internet Journal, First Monday, Jun. 2, 2003, vol. 8, No. 6, pp. 1-22.
Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

(Continued)

*Primary Examiner* — Kuen Lu
(74) *Attorney, Agent, or Firm* — Patent Law Works LLP (57) ABSTRACT

A system and method for organizing indications of approval using a collection application is disclosed. The collection application includes a processing module, a social network application, a collection module, a sharing module, a permission module, a user interface engine and a suggestion module. The processing module receives an indication of approval submitted by a user. The collection module groups the indication of approval into a collection. The sharing module shares the collection with one or more users. The suggestion module suggests a collection or indications of approval to a user. The user interface engine generates a user interface that includes the collection.

20 Claims, 7 Drawing Sheets

(56) References Cited

OTHER PUBLICATIONS

Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

\* cited by examiner

… 125*n* and a social network server 101. In FIG. 1 and

ORGANIZING INDICATIONS OF APPROVAL FOR COLLECTIONS

BACKGROUND

The specification relates to organizing indications of approval. In particular, the specification relates to grouping and sharing an indication of approval using collections associated with a social network.

Over the last decade, social networking has become increasingly popular. People frequently show their approval for websites, posts and comments by clicking indication of approval buttons, such as a +1, like or a thumbs up. Currently, there is no way to easily store, find and share multiple indications of approval. For example, if users want to find an indication of approval, they search through the entire list of items. Also, if users want to share multiple indications of approval with a friend they select and share each item separately. Both of these methods are, of course, very inefficient.

SUMMARY

In some examples, the specification describes a system and method for organizing indications of approval. The system includes a collection application that comprises a processing module, a social network application, a collection module, a sharing module, a permission module, a user interface engine and a suggestion module. The processing module receives and processes indications of approval associated with uniform resource locators from a user of a social network. The collection module generates collections that include indications of approval. The user interface engine generates a user interface that includes collections that are provided to the user. The specification also includes a method for organizing indications of approval, executing on one or more computing devices that comprises receiving indications of approval associated with uniform resource locators from a first user of a social network, generating a first and a second collection that each include at least one of the indications of approval and providing the first and the second collections to the first user. In one embodiment, the first collection is provided to at least one of another user, a private group and a public group.

In one embodiment, indications of approval associated with uniform resource locators from a first user device associated with a first user of a social network are received, a first and a second collection are generated that each include at least one of the indications of approval, the first and second collections are provided to the user, a first selection of the first collection is received from the first user, a second selection of a distribution list for the first user device associated with the first user is received and an indication of the access to the first collection for the distribution list is stored.

In another embodiment, the indications of approval include at least one of a title, a topic, a keyword and a summary. The indications of approval are grouped into the first collection based on at least one of the title, the topic, the keyword and the summary. A description for the first collection is determined based at least in part on at least one of the title, the uniform resource locator, the category and the summary.

In yet another embodiment, a suggestion module receives a user profile associated with the first user and suggests a collection to the user based at least in part on the user profile. The user profile includes, for example, at least one of interests, activities and demographics. In another embodiment, the suggestion module compares the indications of approval to other collections, identifies a collection that includes the at least one of the indications of approval and provides the collection to the first user as a suggestion. In another embodiment, the collection is suggested to the user based at least in part on a number of times that the collection is shared or viewed by other users.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Example Overview

The description includes a system and method for organizing indications of approval into collections. The indications of approval include a title, a uniform resource locator (URL), a category and a summary. The indications of approval are grouped as a collection that includes a description, which can be derived from the title, the URL, the category and the summary. For example, the user creates a collection of web tools.

The user can share the collection or discrete indications of approval within the collection with a distribution group listed in a distribution list. The distribution group includes a public group, a private group, a second user or discrete indications of approval are made available to the public. This allows for users to share collections while some of the indications of approval within the collection are kept private.

In one embodiment, the system includes a suggestion module that receives a user profile, identifies collections that the user might find interesting and suggests the collections to the user. The user profile may include interests (e.g. soccer, reading, food), activities (searching history, indications of approval, posts, comments) and/or demographics (age, ethnicity, location). In an embodiment, the suggestion module suggests a collection based on another factor, such as a number of times that a particular collection is shared or viewed in the social network. In one embodiment, the suggestion module compares the indications of approval to other collections and suggests collections that include at least one of the indications of approval.

System Overview

Figure 1:
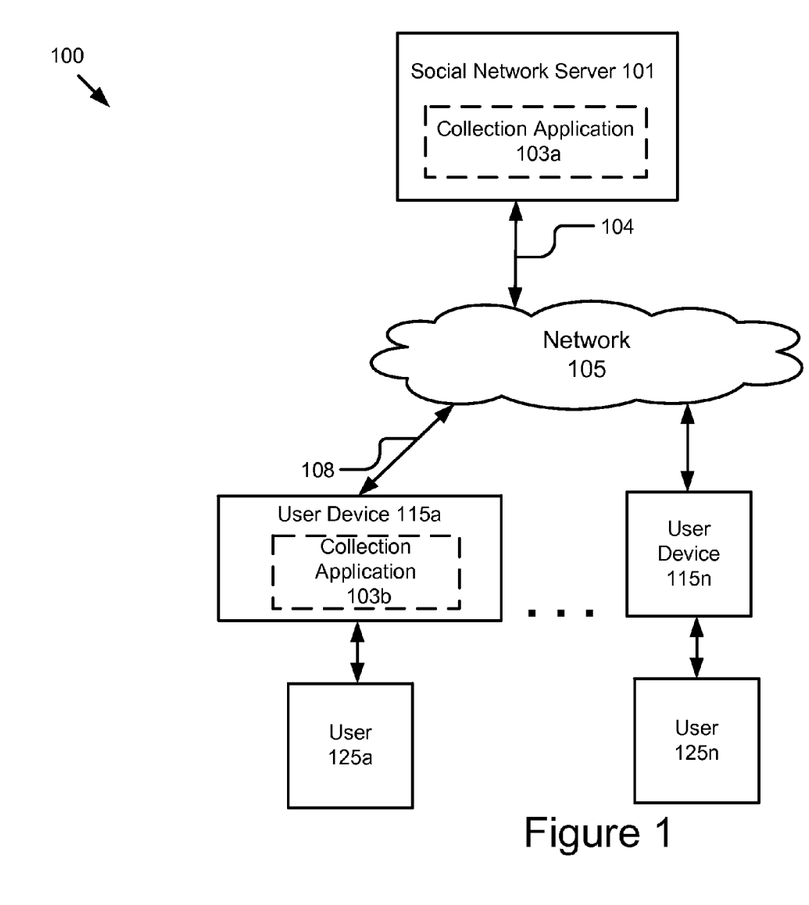
FIG. 1 is a high-level block diagram illustrating one embodiment of a system for organizing an indication of approval.

FIG. 1 illustrates a block diagram of a system 100 for organizing an indication of approval according to some examples. The illustrated description of the system 100 includes user devices 115*a* … 115*n* that are accessed by users 125*a* … 125*n* and a social network server 101. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities are communicatively coupled via a network 105.

The network 105 is a conventional type, wired or wireless, and may have numerous different configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 105 is coupled to the user devices 115a, 115n and the social network server 101, in practice single or multiple networks 105 can be connected to the entities.

In one embodiment, the collection application 103a is operable on the social network server 101, which is coupled to the network via signal line 104. The social network server 101 sends and receives data to and from one or more of the user devices 115a, 115n via the network 105. For example, the social network server 101 is a hardware server. Although only one social network server 101 is shown, persons of ordinary skill in the art will recognize that multiple social network servers 101 may be present.

In another embodiment, the collection application 103b is stored on a user device 115a, which is connected to the network via signal line 108. The user device 115a is any computing device that includes a memory and a processor, for example a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. The user 125a interacts with the user device 115a. In one embodiment, the collection application 103b acts in part as a thin-client application that is stored on the user device 115a and in part as components that are stored on the social network server 101. Although only two user devices 115a, 115n are illustrated, persons of ordinary skill in the art will recognize that numerous different user devices 115n are available to numerous different users 125n.

The collection application 103 is code and routines for organizing indications of approval. The collection application 103 groups indications of approval into a collection. The collection application 103 receives and processes indications of approval from a user, groups indications of approval into a collection and shares the collection to one or more users. In one embodiment, the collection application 103 determines the sharing levels before allowing a user to view a collection. In another embodiment, the collection application 103 suggests a collection to a user. The collection application 103 is described in further detail below with reference to FIGS. 2A-5.

Example System

Figure 2A:
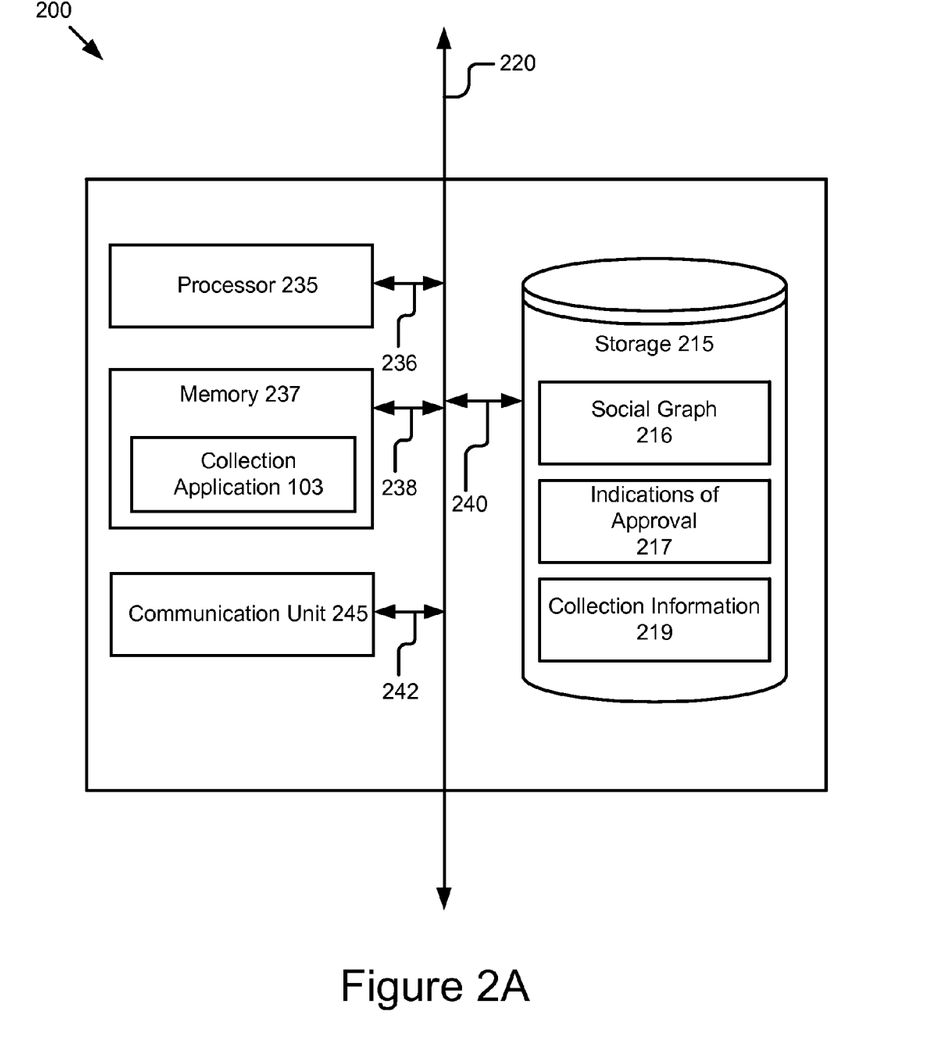
FIG. 2A is a block diagram illustrating one embodiment of hardware implementing the functionality of organizing an indication of approval.

Referring now to FIG. 2A, the hardware implementing the functionality of organizing an indication of approval is shown in more detail. FIG. 2A is a block diagram of a computing device 200 that includes memory 237, storage 215, a processor 235 and a communication unit 245. In one embodiment, the computing device 200 is a social network server 101. In another embodiment, the computing device 200 is a user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. In one embodiment, the memory 237 includes the collection application 103. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage 215 is a non-transitory memory that stores data necessary for the functionality of the collection application 103. The storage 215 is communicatively coupled by the bus 220 for communication with the other components of the computing device 200 via signal line 240. The data stored in the storage 215 includes a social graph 216, indications of approval 217 and collection information 219. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, etc. The indications of approval 217 is a list (or a database) of indications of approval. For example, indications of approval 217 include links to items (e.g. web pages, images, videos, etc.). The social network content is explained in further detail below with reference to the social network application 203.

The communication unit 245 transmits and receives data to and from at least one of the user device 115 and the social network server 109 depending upon where the collection application 103 is stored. The communication unit 245 is coupled to the bus 220 via signal line 242. In one embodiment, the communication unit 245 includes a port for direct physical connection to the network 105 or to another communication channel. For example, the communication unit 245 includes a USB, SD, CAT-5 or similar port for wired communication with the user device 115. In another embodiment, the communication unit 245 includes a wireless transceiver for exchanging data with the user device 115 or any other communication channel using one or more wireless communication methods, such as IEEE 802.11, IEEE 802.16, BLUETOOTH® or another suitable wireless communication method.

In yet another embodiment, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 245 includes a wired port and a wireless transceiver. The communication unit 245 also provides other conventional connections to the network for distribution of files and/or media objects using standard network protocols such as TCP/IP, HTTP, HTTPS and SMTP as will be understood by those skilled in the art.

Example Application

Figure 2B:
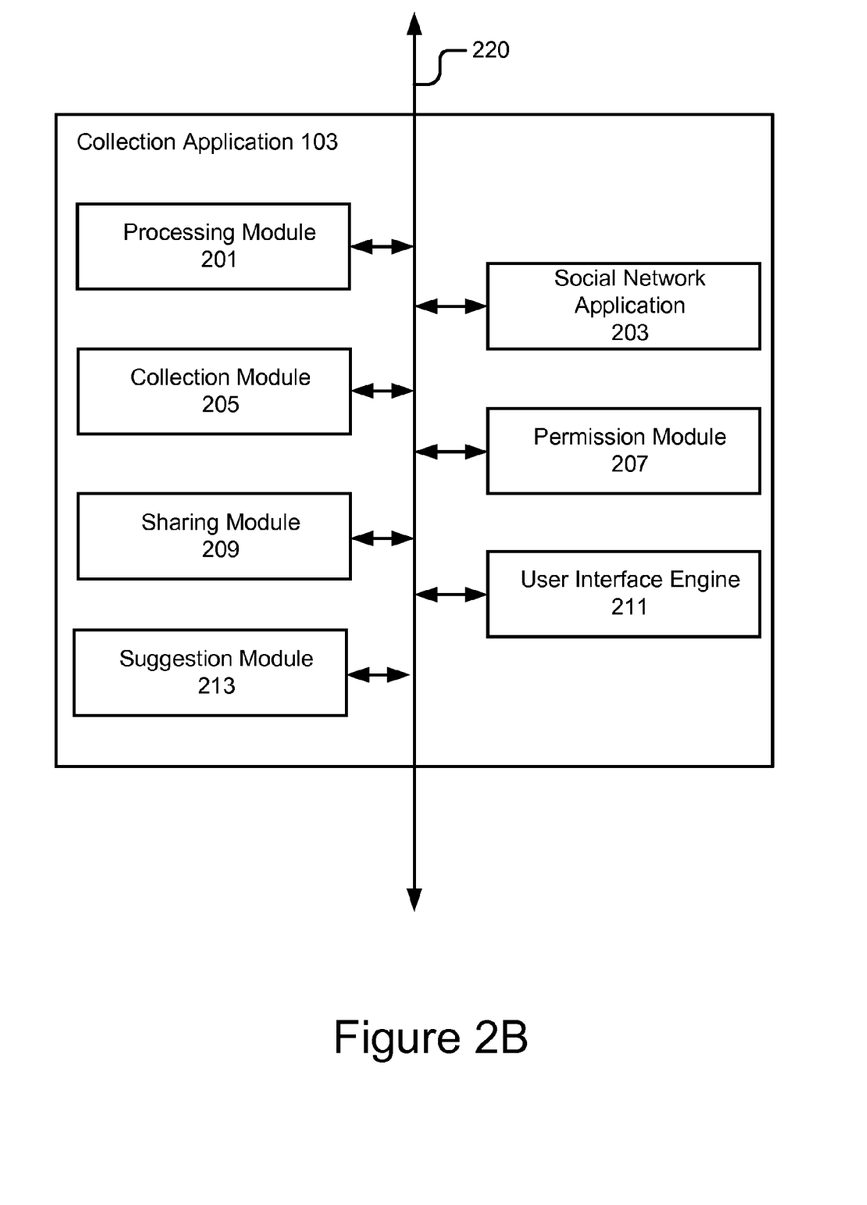
FIG. 2B is a block diagram illustrating one embodiment of a collection application.

Referring now to FIG. 2B, the collection application 103 is shown in more detail. In one embodiment, the collection application 103 comprises a processing module 201, a social network application 203, a collection module 205, a permission module 207, a sharing module 209, a user interface engine 211 and a suggestion module 213 that communicate over the bus 220.

The processing module 201 is software including routines for receiving and processing user data including indications of approval from a user and social network data. In one embodiment, the processing module 201 is a set of instructions executable by the processor 235 to provide the functionality described below for receiving and processing one or more indications of approval or one or more collections from a user. In another embodiment, the processing module 201 is stored in the memory 237 of the computing device 200 and is accessible and executable by the processor 235. In either embodiment, the processing module 201 is adapted for cooperation and communication with the processor 235 and other components of the computing device 200.

The processing module 201 receives information via the communication unit 245 from a user device 115. The processing module 201 identifies the type of data being received and transmits the data to the appropriate module or engine. For example, the processing module 201 receives data for creating a post on the social network from a user device 115. In another embodiment, the processing module 201 receives an indication of approval from a user device 115 and transmits the indication to the collection module 205. The processing module 201 sends the social network data to the social network application 203. The indication of approval is information including at least one title, a uniform resource locator (URL), a topic, a keyword and a summary. For example, a user clicks an indication of approval button, usually in the form of text or an image, for example, a like, a thumbs up or a +1. After the user clicks the indication of approval button, the processing module 201 stores the indications of approval 217 in storage 215.

The social network application 203 is software including routines for generating and managing a social network. In one embodiment, the social network application 203 is a set of instructions executable by the processor 235 to provide the functionality described below for generating and managing a social network. In another embodiment, the social network application 203 is stored in the memory 237 of the computing device 200 and is accessible and executable by the processor 235. In either embodiment, the social network application 203 is adapted for cooperation and communication with the processor 235, the storage 215, the processing module 201, the user interface engine 211 and other components of the computing device 200.

A social network is any type of social structure where the users 125 are connected by a common feature, for example, Google+. The common feature includes friendship, family, work, an interest, etc. The common features are provided by one or more social networking systems, such as those included in the system 100, including explicitly-defined relationships and relationships implied by social connections with other online users, where the relationships form a social graph 216. In some examples, the social graph 216 reflects a mapping of these users 125 and how they are related.

The social network application 203 manages the social network by handling registration of users, publication of content (e.g. posts, comments, photos, links, etc.), managing of groups, managing different sharing levels, updating the social graph 216, etc. The social network application 203 registers a user by receiving information such as a username and password and generates a user profile that is associated with the user. In one embodiment, the user profile includes additional information about the user including interests (e.g. soccer, reading, food), activities (searching history, indications of approval, posts, comments) and demographics (age, ethnicity, location).

In one embodiment, the social network application 203 receives social network content from the processing module 201. The social network content includes, for example, a description of activities performed by the user 125 and the user's friends, conversations, events, etc. The social network application 203 transmits instructions to the user interface engine 211 to generate a user interface that includes the social network content.

The collection module 205 is software including routines for organizing indications of approval into a collection. In one embodiment, the collection module 205 is a set of instructions executable by the processor 235 to provide functionality described below for grouping indications of approval into a collection. In another embodiment, the collection module 205 is stored in the memory 237 of the computing device 200 and is accessible and executable by the processor 235. In either embodiment, the collection module 205 is adapted for cooperation and communication with the processor 235 and other components of the computing device 200.

The collection module 205 receives one or more indications of approval from the processing module 201 and generates a collection. Then the collection module 205 generates a collection and groups the indications of approval into the collection. The term collection as used herein encompasses its plain and ordinary meaning including, but not limited to, an organizational structure used for simplified retrieval and sharing of indications of approval. A collection can contain numerous different of indications of approval and a name. In one embodiment, the collection is a label, tag, folder, etc.

In one embodiment, the collection module 205 receives a name and instructions for how to group the indications of approval from a user for the collection via the user device 115. In another embodiment, the collection module 205 groups the indications of approval automatically and generates a name for the collection. For example, the collection module 205 compares the indications of approval to lists created by other users and organizes them similarly. In another embodiment, the collection module 205 generates a description for the collection based on a title, a uniform resource locator (URL), a topic, a keyword and a summary associated with the indications of approval.

In another embodiment, the collection module 205 first generates a collection and then adds the indications of approval. The collection module 205 receives a selection of one or more indications of approval from the user device 115 and groups them into the collection. For example, the collection module 205 receives one or more indications of approval from a user that used a drag-and-drop method on the user interface to group the indications of approval into the collection. For another example, the collection module 205 receives a selection of indications of approval from a user via checkboxes on the user interface. This system for grouping indications of approval into collections creates a method for quickly searching for and sharing multiple indications of approval.

The collection module 205 groups indications of approval into a collection. In one embodiment, the collection module 205 searches the summary and title of the indication of approval for keywords (e.g. baseball, election, health, animals, etc.). For example, the collection module 205 detects that the indication of approval summary contains the word "baseball." The collection module 205 then generates a collection and names it "sports" and groups the baseball indication of approval into the collection "sports." In another example, the collection module 205 checks the URL and uses the domain as an indication of the topic. For example, the URL is http://www.website.com/index.html. The collection module 205 generates a collection and names it "website.com" and groups the indication of approval into the collection "website.com."

In another embodiment, the collection module 205 creates multiple layers of collections. For example, a user's profile contains many sports related indications of approval. The collection module 205 groups all of the sports related indications of approval into a collection and names the collection "sports." The collection module 205 then groups all the basketball indications of approval into a collection and names the collection "basketball," the collection module 205 groups all the baseball related indications of approval into a collection and names the collection "baseball," and so on. The collection module 205 groups all of the sport collections into the collection "sports." This creates a logical categorization and reduces the amount of time necessary to find a specific indication of approval within a large group of indications of approval.

In another embodiment, the collection module 205 groups an indication of approval into multiple collections. For example, a user has an indication of approval that contains a URL to sports scores for baseball and basketball. The collection module 205 receives input from the user to store this indication of approval in both the baseball and basketball collections. This creates a method for quick retrieval of the sports scores URL whether the user is looking at the baseball or basketball indications of approval.

The permission module 207 is software including routines for assigning a visibility level to collections or individual indications of approval and for determining whether a user has permission to view a collection or indications of approval. In one embodiment, the permission module 207 is a set of instructions executable by the processor 235 to provide the functionality described below for checking permissions to view a collection. In another embodiment, the permission module 207 is stored in the memory 237 of the computing device 200 and is accessible and executable by the processor 235. In either embodiment, the permission module 207 is adapted for cooperation and communication with the processor 235 and other components of the computing device 200.

The permission module 207 receives a visibility level from the user that created a collection or individual indications of approval, identifies the visibility level and determines whether a requesting user has permission to view the collection or indications of approval before instructing the sharing module 209 that a collection can be transmitted to the requesting user. The visibility level is one of public, selectively visible (e.g., visible to all people within a public or private group, a network, only the user that created the indication of approval or the collection, or only to selected users) and hidden from everyone except the creator. In one embodiment, the permission module 207 determines the identity of the requesting user from the username, display name or any other information present on the requesting user's profile.

One advantage of being able to specify a visibility level of individual indications approval is that the collection can be public with certain indications of approval within the list remaining private. Take, for example, a collection of indications of approval for things in Chicago that the user likes. The user is fine with the public having access to the user's likes for favorite restaurants, but the user prefers to keep certain indications of approval private, such as driving directions to the user's parents' house. The user does not want the public to know about his parents' address, but the user finds it helpful to have all the indications of approval in one place.

In one embodiment, the permission module 207 sets the visibility level of the indication of approval to a default visibility level during creation of the indication of approval. In another embodiment, the visibility level of the collection is set to a default visibility during creation of the collection.

In yet another embodiment, the permission module 207 does not share the name of the collection. For example, the sharing module 209 shares a collection with a user. The permission module 207 receives a request to view the collection. The permission module 207 communicates with the user interface engine 211 to generate a user interface that includes the indications of approval and does not include the name of the collection.

The sharing module 209 is software including routines for sharing a collection with one or more users. In one embodiment, the sharing module 209 is a set of instructions executable by the processor 235 to provide the functionality described below for sharing a collection or indication of approval with one or more users. In another embodiment, the sharing module 209 is stored in the memory 237 of the computing device 200 and is accessible and executable by the processor 235. In either embodiment, the sharing module 209 is adapted for cooperation and communication with the processor 235 and other components of the computing device 200.

The sharing module 209 shares a collection with a user after receiving permission from the permission module 207 to transmit the collection. In one embodiment, the sharing module 209 receives a collection associated with a first user and sends the collection to a second user. For example, the sharing module 209 transmits the collection via the communication unit 245 as an email, a message on a social network, an instant messenger (IM), etc. One skilled in the art will recognize that any method of sharing data known in the art may be used. In another embodiment, the sharing module 209 receives a selection of the collection from a first user, receives a second selection of a distribution list and provides the first selection to the second selection. The distribution list includes a distribution group, for example, a public group, a private group, a second user or discrete indications of approval are made available to the public. In this example, it is possible to override the visibility level of the collection that was established via the permission module 207.

In another embodiment, the sharing module 209 transmits one or more indications of approval apart from the collection. In yet another embodiment, the sharing module 209 transmits the collection to one or more groups of users. One skilled in the art will recognize that any combination of collections and indications of approval may be transmitted by the sharing module 209 to any combination of users and groups.

In another embodiment, the sharing module 209 shares the collection with users outside the social network. For example, the sharing module 209 receives an email address from the user and transmits the collection to the email addresses via the communication unit 245. In another example, the sharing module 209 shares the indications of approval on a website and the user interface engine 211 generates a user interface that includes the collection. The collection is available for viewing by users with permission.

The user interface engine 211 is software including routines for generating a user interface. In one embodiment, the user interface engine 211 is a set of instructions executable by the processor 235 to provide the functionality described below for generating a user interface that includes information from the social network, indications of approval and collections. In another embodiment, the user interface engine 211 is stored in the memory 237 of the computing device 200 and is accessible and executable by the processor 235. In either embodiment, the user interface engine 211 is adapted for cooperation and communication with the processor 235 and other components of the computing device 200.

The user interface engine 211 receives the indications of approval and collection information from the processing module 201 and generates graphical data for providing a user interface for displaying a collection. The user interface engine 211 sends the graphical data to the application (e.g., a browser) in the user device 115 causing the application to display the collection in a user interface. One skilled in the art will recognize that the user interface engine 211 may generate graphical data other objects as well. The user interface is explained in further detail below with reference to FIG. 3A-3B.

In one embodiment, the user interface engine 211 also generates a user interface for users to search for collections. For example, a user enters search terms into a text box on the user device that was generated by the user interface engine 211; the search terms are received by the processing module 201, which queries the storage 215 for matching collection information 219 and indications of approval 217; the storage 215 transmits the matches to the permission module 207, which filters out the matches that the user does not have permission to view and the sharing module 209 transmits the matches to the user via the communication unit 245.

The suggestion module 213 is software including routines for suggesting a collection. In one embodiment, the suggestion module 213 is a set of instructions executable by the processor 235 to provide the functionality described below for suggesting a collection to one or more users. In another embodiment, the suggestion module 213 is stored in the memory 237 of the computing device 200 and is accessible and executable by the processor 235. In either embodiment, the suggestion module 213 is adapted for cooperation and communication with the processor 235 and other components of the computing device 200.

In another embodiment, the suggestion module 213 suggests a collection in which to store the indication of approval.

The suggestion module 213 checks the summary of the indication of approval for keywords or checks the URL and uses the domain. In yet another embodiment, the suggestion module 213 identifies collections to suggest to the user based on a match between the topic of the collection or indications of approval within the collection and the user profile associated with the user. The suggestion module 213 sends the suggestion to the user interface engine 211. The user interface engine 211 generates a user interface that includes one or more suggestions for the collection.

In yet another embodiment, the suggestion module 213 compares indications of approval to collections created by other users and suggests public collections or other public indications of approval within the collection to the user. The comparison includes both finding collections with the same indication of approval and identifying a topic or keyword in the indication of approval and finding collections with the same topic or keyword. This helps the user discover new material and can also be a way to make new connections. For example, a first user is interested in hiking and indicates approval of several hiking locations and the suggestion module 213 identifies a public collection created by a second user that includes those hiking locations as well as other hiking locations, if the first user likes the suggestions he can start following the second user to find more hiking locations or establish a friendship.

In another embodiment, the suggestion module 213 tracks the popularity of public collections and generates a list of popular collections organized according to topics or keywords. In one embodiment, popularity is measured by a number of times that the collection is shared or viewed by other users. For example, popular collections could include a collection of helpful financial tools that includes popular banks, a website for preparing tax materials, a website for managing finances and a website for tracking retirement goals. Once a user selects a collection from the user interface generated by the user interface engine 211, the collection module 205 adds additional indications of approval to the collection in response to the user's selections to personalize the collection.

Example User Interface Engine

Figure 3A:
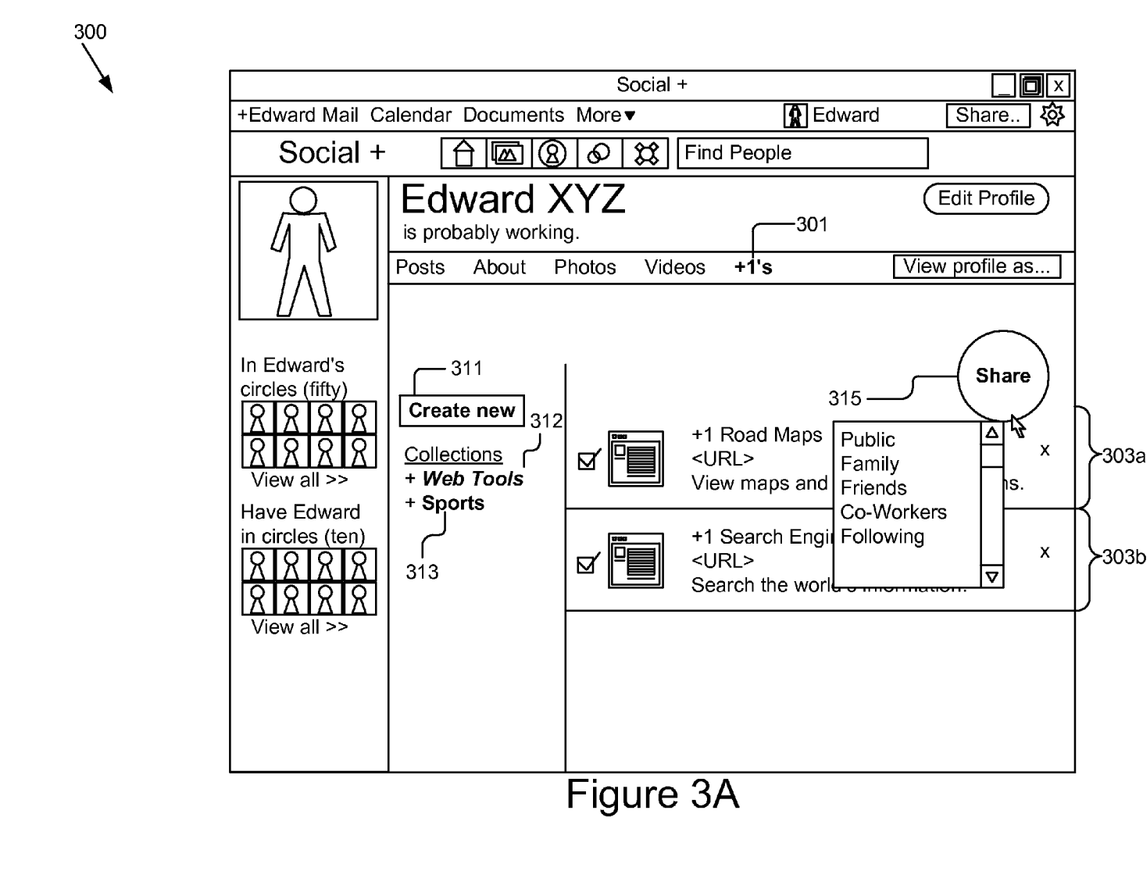
FIG. 3A is one example of a graphic representation of a user interface that is generated by a user interface engine that includes a collection according to one embodiment.

Turning now to FIG. 3A, one example of a graphic representation of a user interface 300 generated by the user interface engine 211 is illustrated. The user interface 300 includes indications of approval 303a, 303b that are associated with the web tools collection 312 and a sports collection 313. In this example, the user device 115 includes a large screen, such as one on a personal computer or a laptop, although the user interface is easily converted to a display for a smaller screen, such as a screen on a tablet or a smart phone, by removing the summary of the user's circles.

In this example, a browser window displays a link 301, two indications of approval 303a, 303b, a create new button 311 for creating a new collection and two collections 312, 313. When the +1 301 is selected the collection information is displayed in the browser window. The collections 312, 313 are displayed and can contain different number indications of approval. In this example, the indications of approval 303a, 303b for the web tools collection 312 is displayed to the right of the list of collections. The user creates a new collection by selecting the create new button 311.

In one embodiment the user interface engine 211 adds an indication of approval into a collection 313 in response to receiving a user's action to drag and drops an indication of approval into a collection 313. In another embodiment the user clicks a share button 315 and a drop-down list of groups appears in the browser. The user then selects one or more groups and the sharing module 209 shares the selected indications of approval with the selected groups via the communication unit 245.

Figure 3B:
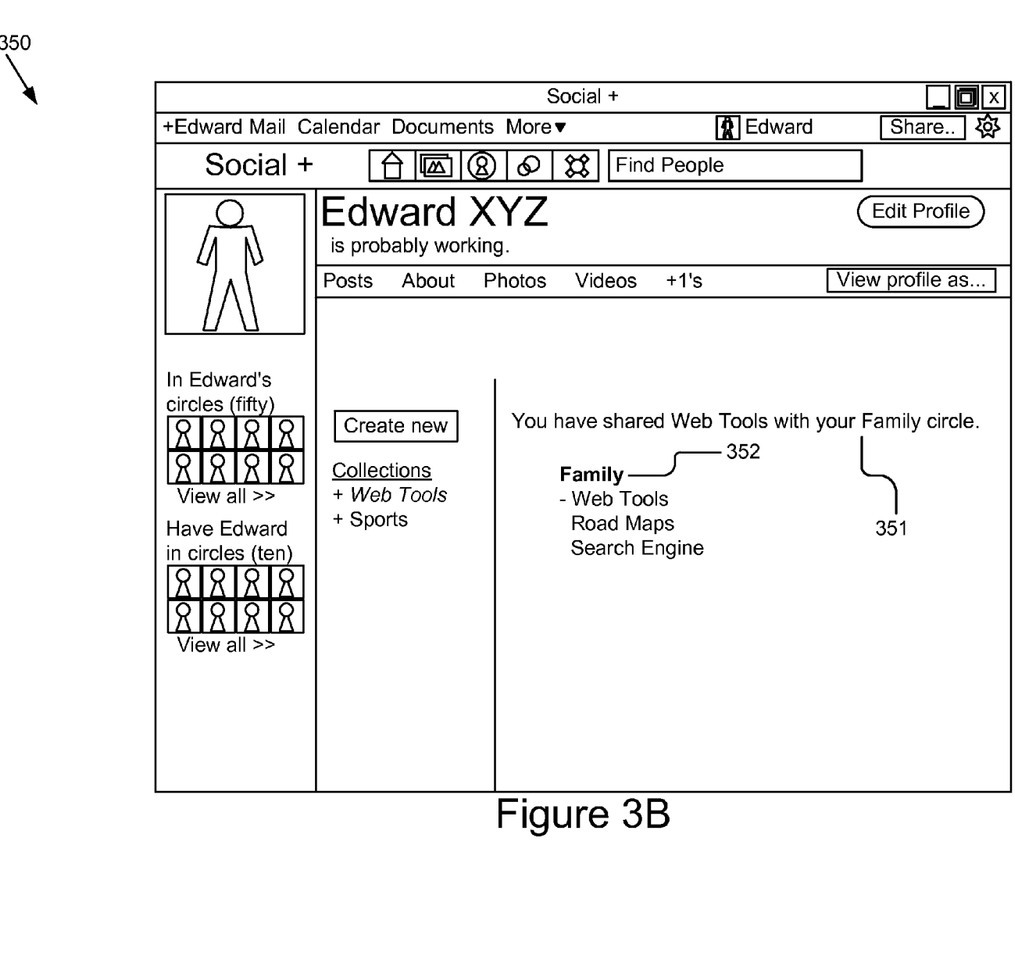
FIG. 3B is one example of a graphic representation of a user interface that is generated by a user interface engine that includes a collection according to an embodiment.

FIG. 3B illustrates a graphical representation of the user interface after the user shares the collection with other members. In this example the user interface includes a notification 351 that the web tools collection was shared with the user's family circle, a family header 352 that indicates the group that received the collections and a list of collections shared with the family group.

Example Methods

Figure 4:
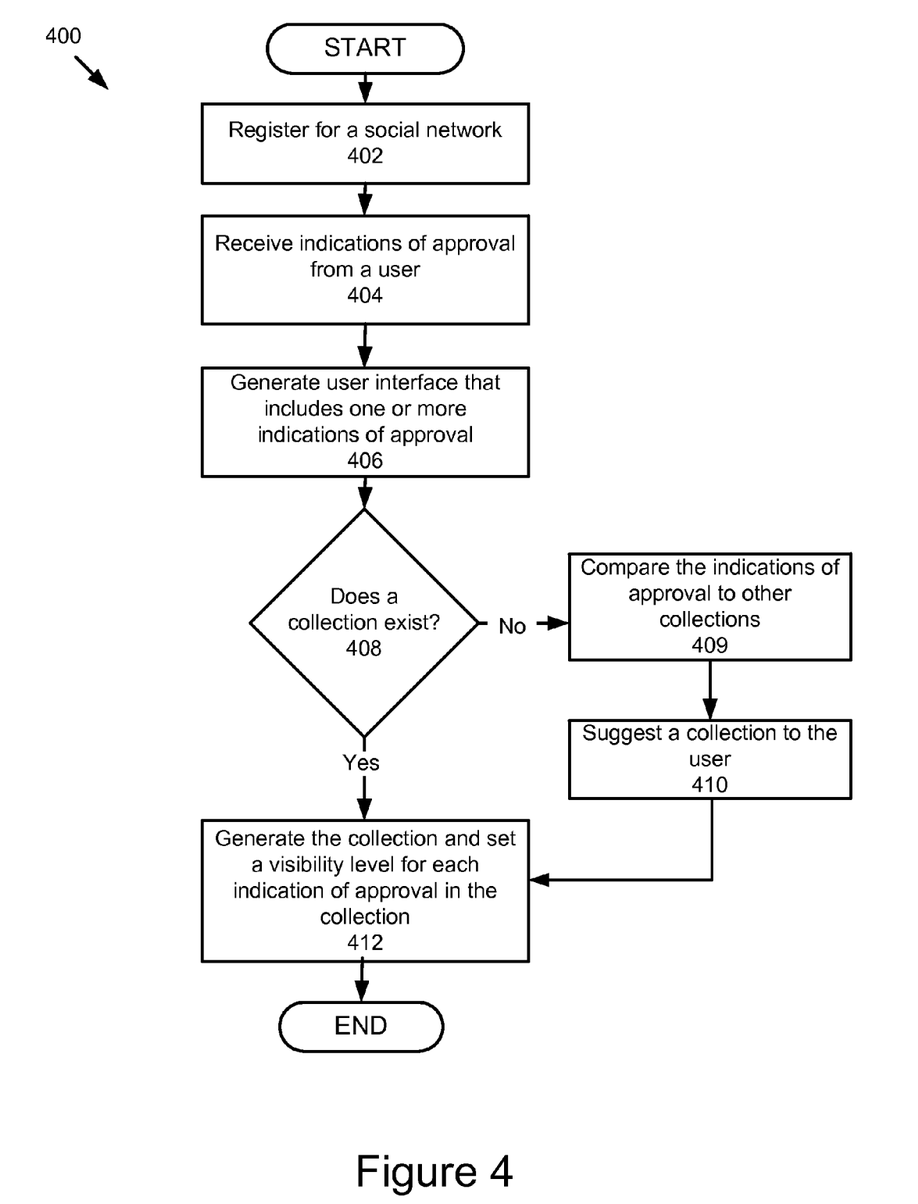
FIG. 4 is a flow diagram of one embodiment of a method for grouping an indication of approval into a collection.
Figure 5:
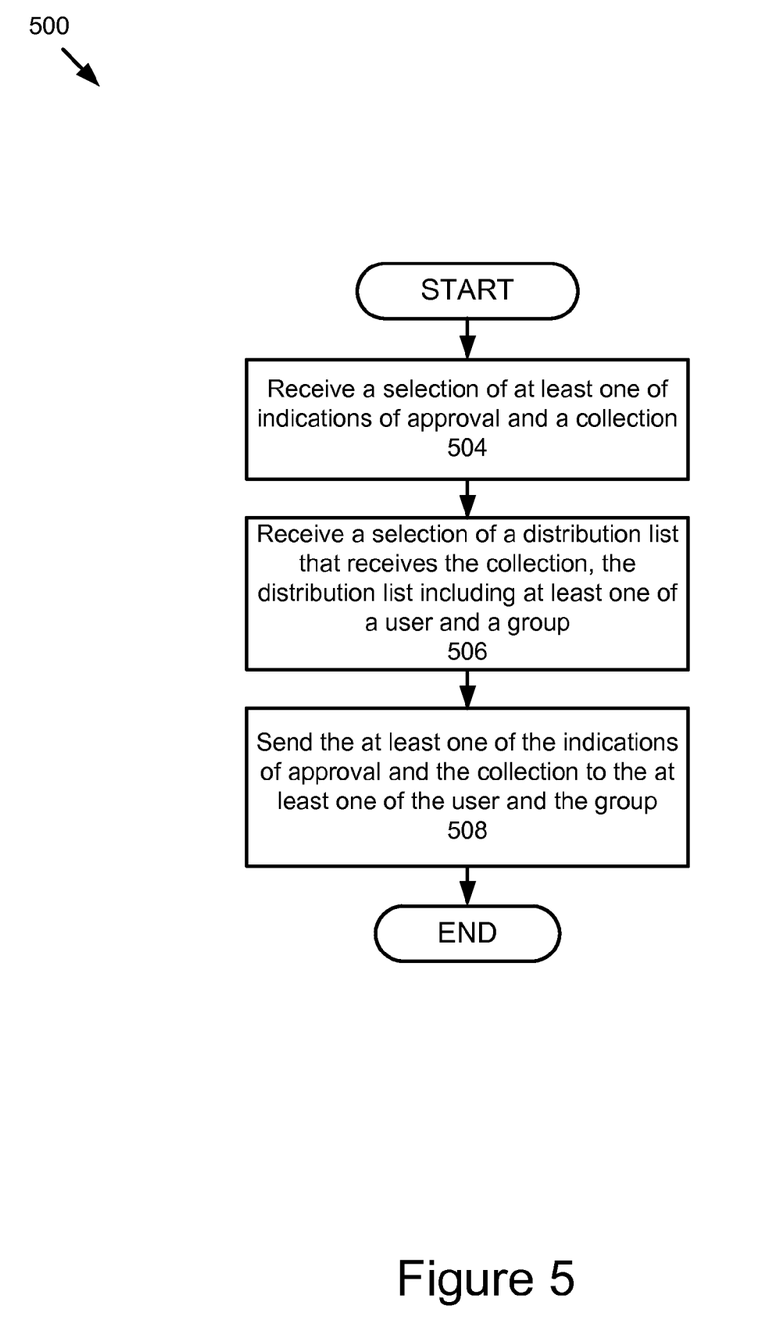
FIG. 5 is a flow diagram of one embodiment of a method for sharing a collection to one or more users.

Referring now to FIGS. 4-5, various embodiments of the methods for sharing and grouping indications of approval will be described. FIG. 4 is a flow diagram of one embodiment of a method 400 for grouping an indication of approval into a collection. In one embodiment, the collection application 103 includes processing module 201, a social network application 203, a collection module 205, a user interface module 207 and a suggestion module 213. The processing module 201 receives input from a user device 115 and transmits the user input to the social network application 203, which registers 402 a user for a social network. Registration includes establishing a username and password, creating groups of people that are related to the user (following, friendship, business associations, etc.). The processing module 201 receives 404 indications of approval from a user. For example, the user approves of a comment, an article or a website. The user interface engine 211 generates 406 a user interface that includes one or more indications of approval. The user interface engine 211 provides the user interface to the user device 115 via the communication unit. The user device 115 displays the user interface.

The collection module 205 determines 408 if a collection already exists. If a collection does not exist, a suggestion module 213 compares 409 the indications of approval to other collections to identify collections that contain the same indications of approval that, therefore, might be interesting to the user and suggests 410 a collection to the user. For example, the user provides an indication of approval for an article about a venture capitalist, the suggestion module 213 identifies that the topic is about a venture capitalist and that the user is located in Silicon Valley and the suggestion module 213 identifies a collection about all venture capitalists in Silicon Valley. The suggestion module 213 also identifies a collection that includes articles about how to create a startup that includes a few articles about venture capitalists.

If a collection does exist or if the user wants to incorporate the suggested collection, the collection module 205 generates 412 a collection and sets a visibility level for each indication of approval in the collection that is associated with the user. The visibility level is defined by the user or set to a default level, such as private to the user.

FIG. 5 is a flow diagram of one embodiment of a method 500 for sharing one or more collections. In one embodiment, the collection application 103 includes processing module 201, a collection module 205, a permission module 207, a sharing module 209, a user interface module 207 and a suggestion module 213. The sharing module 209 receives 504 a selection of at least one of an indication of approval and a collection from the user device 115 for distribution. For example, the user wants to share driving directions. The sharing module 209 also receives 506 a selection of a distribution list that receives the collection. The distribution list includes at least one of a user and a group from the user device 115. For example, the user wants to share the driving directions with a travel group. The user or the group is a distribution group that includes a public group, a private group or a second user. In one embodiment, the sharing module 209 receives the selection from the permission module 207, which received a request from a user to view the content and determined whether the user had permission to view the content based on the visibility level associated with the indications of approval and the collection. For example, only members of the group that are also friends with the user can view the content. In another example, members of the group can view the content but people that peruse the group content cannot see the driving directions until they become a member as approved by a group administrator. The sharing module 209 sends 508 the at least one indication of approval and collections to the at least one of the user and group via the communication unit 245.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for organizing indications of approval, executing on one or more computing devices, the method comprising:
    receiving, at the one or more computing devices, the indications of approval associated with uniform resource locators from a first user device associated with a first user of a social network;
    determining a first topic for a first indication of approval and a second topic for a second indication of approval, the first and second topics being different;
    generating, using the one or more computing devices, a page in the social network comprising a first collection with the first topic and a second collection with the second topic, the first and second collections each including at least one of the indications of approval and a summary for each of the indications of approval;
    providing, at the one or more computing devices, the first and second collections to the first user;
    receiving, at the one or more computing devices, a first visibility level for accessing a first indication of approval in the first collection from the first user device associated with the first user;
    receiving, at the one or more computing devices, a second visibility level for accessing a second indication of approval in the first collection from the first user device associated with the first user; and
    storing the first and second visibility levels associated with the first collection.

2. The method of claim 1, further comprising:
    receiving a selection of a distribution list that receives the second collection; and
    providing the distribution list with the second collection.

3. The method of claim 2, wherein the distribution list includes at least one of a public group, a private group and a second user.

4. The method of claim 1, wherein the first visibility level is hidden from all users except a creator of the first indication of approval and further comprising:
    receiving a request to view the first collection from a second user;
    determining whether the second user has permission to view the first indication of approval and the second indication of approval in the first collection based on the first visibility level and the second visibility level associated with the first collection;

determining that the second user is lacking permission to view the first indication of approval; and responsive to the second user having permission to view the second indication of approval, providing the second user with the second indication of approval in the first collection.

5. The method of claim 1, wherein the indications of approval include at least one of a title and a keyword.

6. The method of claim 5, further comprising grouping the indications of approval into the first collection based on at least one of the title, the first topic, the keyword and the summary.

7. The method of claim 6, further comprising determining a description for the first collection based at least in part on at least one of the title, the uniform resource locators, a category and the summary.

8. The method of claim 1, further comprising:
accessing a user profile associated with the first user; and
suggesting a third collection to the first user based at least in part on the user profile.

9. The method of claim 8, wherein the user profile includes at least one of interests, activities and demographics.

10. The method of claim 1, further comprising:
comparing at least one of the indications of approval to other collections;
identifying a third collection that includes the at least one of the indications of approval; and
providing the third collection to the first user as a suggestion.

11. The method of claim 1, further comprising suggesting a third collection to the first user based at least in part on a number of times that the third collection is shared or viewed by other users.

12. A system for organizing indications of approval, the system comprising:
one or more processors; and
a memory storing instructions that, when executed by the one or more processors cause the system to:
receive the indications of approval associated with uniform resource locators from a first user device associated with a first user of a social network;
determine a first topic for a first indication of approval and a second topic for a second indication of approval, the first and second topics being different;
generate a page in the social network comprising a first collection with the first topic and a second collection with the second topic, the first and second collections each including at least one of the indications of approval and a summary for each of the indications of approval;
provide the first and second collections to the first user;
receive a first visibility level for accessing a first indication of approval in the first collection from the first user device associated with the first user;
receive a second visibility level for accessing a second indication of approval in the first collection from the first user device associated with the first user; and
store the first and second visibility levels associated with the first collection.

13. The system of claim 12, wherein the one or more processors are further configured to:
receive a selection of a distribution list that receives the second collection; and
provide the distribution list with the second collection.

14. The system of claim 12, wherein the first visibility level is hidden from all users except a creator of the first indication of approval and the one or more processors are further configured to:
receive a request to view the first collection from a second user;
determine whether the second user has permission to view the first indication of approval and the second indication of approval in the first collection based on the first visibility level and the second visibility level associated with the first collection;
determine that the second user is lacking permission to view the first indication of approval; and
responsive to the second user having permission to view the second indication of approval, provide the second user with the second indication of approval in the first collection.

15. The system of claim 12, wherein the indications of approval include at least one of a title and a keyword.

16. The system of claim 12, wherein the one or more processors are further configured to group the indications of approval into the first collection based on at least one of the title, the first topic, the keyword and the summary.

17. A computer program product comprising a non-transitory computer usable medium including a computer readable program, wherein the computer readable program when executed on a computer causes the computer to perform steps comprising:
receive indications of approval associated with uniform resource locators from a first user device associated with a first user of a social network;
determine a first topic for a first indication of approval and a second topic for a second indication of approval, the first and second topics being different;
generate a page in the social network comprising a first collection with the first topic and a second collection with the second topic, the first and second collections each including at least one of the indications of approval and a summary for each of the indications of approval;
provide the first and second collections to the first user;
receive a first visibility level for accessing a first indication of approval in the first collection from the first user device associated with the first user;
receive a second visibility level for accessing a second indication of approval in the first collection from the first user device associated with the first user; and
store the first and second visibility levels associated with the first collection.

18. The computer-program product of claim 17, further comprising:
receiving a selection of a distribution list that receives the second collection; and
providing the distribution list with the second collection.

19. The computer-program product of claim 17, wherein the first visibility level is hidden from all users except a creator of the first indication of approval and further comprising:
receiving a request to view the first collection from a second user;
determining whether the second user has permission to view the first indication of approval and the second indication of approval in the first collection based on the first visibility level and the second visibility level associated with the first collection;
determining that the second user is lacking permission to view the first indication of approval; and responsive to the second user having permission to view the second indication of approval, providing the second user with the second indication of approval in the first collection.

20. The computer-program product of claim 17, wherein the indications of approval include at least one of a title and a keyword.

* * * * *